US012074420B2

(12) United States Patent
Armstrong

(10) Patent No.: US 12,074,420 B2
(45) Date of Patent: Aug. 27, 2024

(54) CABLE RETAINING WALL PLATE FOR COMBINATION AC AND DC POWER OUTLETS

(71) Applicant: Paul John Armstrong, Newport, RI (US)

(72) Inventor: Paul John Armstrong, Newport, RI (US)

( * ) Notice: Subject to any disclaimer, the term of this patent is extended or adjusted under 35 U.S.C. 154(b) by 0 days.

(21) Appl. No.: 17/455,901

(22) Filed: Nov. 19, 2021

(65) Prior Publication Data

US 2022/0158432 A1 May 19, 2022

Related U.S. Application Data

(60) Provisional application No. 63/115,860, filed on Nov. 19, 2020.

(51) Int. Cl.
*H02G 3/16* (2006.01)
*H01R 13/58* (2006.01)
*H01R 25/00* (2006.01)
*H02G 3/08* (2006.01)

(52) U.S. Cl.
CPC ........... *H02G 3/16* (2013.01); *H01R 13/5837* (2013.01); *H01R 25/006* (2013.01); *H02G 3/081* (2013.01); *G06F 2213/0042* (2013.01)

(58) Field of Classification Search
CPC .. H02G 3/16; H02G 3/14; H02G 3/08; H02G 3/081; H01R 13/5837; H01R 25/006; G06F 2213/0042

USPC ..... 174/66, 67; 220/241, 242; 439/373, 345, 439/135
See application file for complete search history.

(56) References Cited

U.S. PATENT DOCUMENTS

| 4,662,697 | A | * | 5/1987 | Moses | ................. | H01R 13/443 |
|---|---|---|---|---|---|---|
| | | | | | | 174/67 |
| 7,056,145 | B2 | * | 6/2006 | Campbell, III | .... | H01R 13/6395 |
| | | | | | | 174/67 |

(Continued)

*Primary Examiner* — Angel R Estrada
(74) *Attorney, Agent, or Firm* — Kevin P. Crosby; Rubin & Rubin

(57) ABSTRACT

A wall plate for covering an AC/DC wall outlet includes a generally rectangular or "designer" opening configured to receive the wall outlet. The wall plate includes a cable retention member and a pass-through section. The cable retention member and the pass-through section protrude from a front face of the wall plate. The retention member protrudes far enough to allow the wall plate to seat on the outlet while a cable connector is in a corresponding DC outlet of the wall outlet. The retention member includes a slot configured to allow the connector to pass-through the slot in a first orientation but not a second orientation 90 degrees off from the first orientation. When the connector is in the DC outlet, it is in the second orientation relative to the slot. The pass-through section defines an opening that allows the connector to be received in a second DC outlet corresponding to the pass-through section regardless of orientation of the connector relative to the opening and pass-through section. The cord retention member and pass-through section cooperate to form a bridge between sides of the wall plate over the AC outlet. In one embodiment, the pass-through section extends vertically further from the face of the plate than the cord retention member.

12 Claims, 17 Drawing Sheets

(56) References Cited

U.S. PATENT DOCUMENTS

| | | | | |
|---|---|---|---|---|
| 7,528,323 B2* | 5/2009 | Wu | ............... | H01R 13/72 |
| | | | | 174/67 |
| 7,638,710 B1* | 12/2009 | Vance | ............... | H01R 13/6395 |
| | | | | 220/241 |
| 8,445,781 B1* | 5/2013 | Chasser | ............... | H02G 3/14 |
| | | | | 174/67 |
| 9,653,898 B1* | 5/2017 | Deaton | ............... | H02G 3/14 |
| 9,991,627 B1* | 6/2018 | Hemme | ............... | H01R 13/5804 |
| 10,276,979 B2* | 4/2019 | Cyzen | ............... | H01R 25/003 |
| 10,439,327 B1* | 10/2019 | Cyzen | ............... | H02G 3/14 |

* cited by examiner

US 12,074,420 B2

CABLE RETAINING WALL PLATE FOR COMBINATION AC AND DC POWER OUTLETS

CROSS-REFERENCES TO RELATED APPLICATIONS

U.S. Pat. No. 9,825,414 entitled "WALL PLATE" issued on Nov. 17, 2017 is hereby incorporated by reference in its entirety. This application claims the benefit of U.S. Provisional Patent Application No. 63/115,860, filed on Nov. 19, 2020, which is incorporated by reference herein in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to wall plates for AC outlets. More particularly, this invention pertains to cable management apparatus for combination AC and DC wall outlets. In the past, most AC power outlets were AC only. Today, many AC outlets also include internal DC converters to produce 5 Volt DC outlets with some type of Universal Serial Bus (USB) type A or C connector (See FIGS. 1 and 2). Many businesses make USB chargers (and charging cables or fittings) available to their customers, but keeping the charging cables in the businesses' outlets is a continuous issue for these businesses as customers accidentally or intentionally take the cables or charging fittings with them. One well-known example of such charging cables with electrical connection fittings is Apple's USB Lightning® cable (the terms cable and cord are often used interchangeably, but for purposes of this disclosure a "cable" shall comprise a cord having first and second electrically conductive connectors at first and second ends, respectively, of the cord) that has a USB plug affixed to one end of the Lightning® cable's electrical cord (e.g., for plugging into a DC power source) and a proprietary Lightning® connector affixed to the other end of the cord (e.g., the Lightning® cable connector being designed to fit into a corresponding Lightning® port of Apple iOS devices, such as an iPhone or iPad, to supply DC power to charge such devices).

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
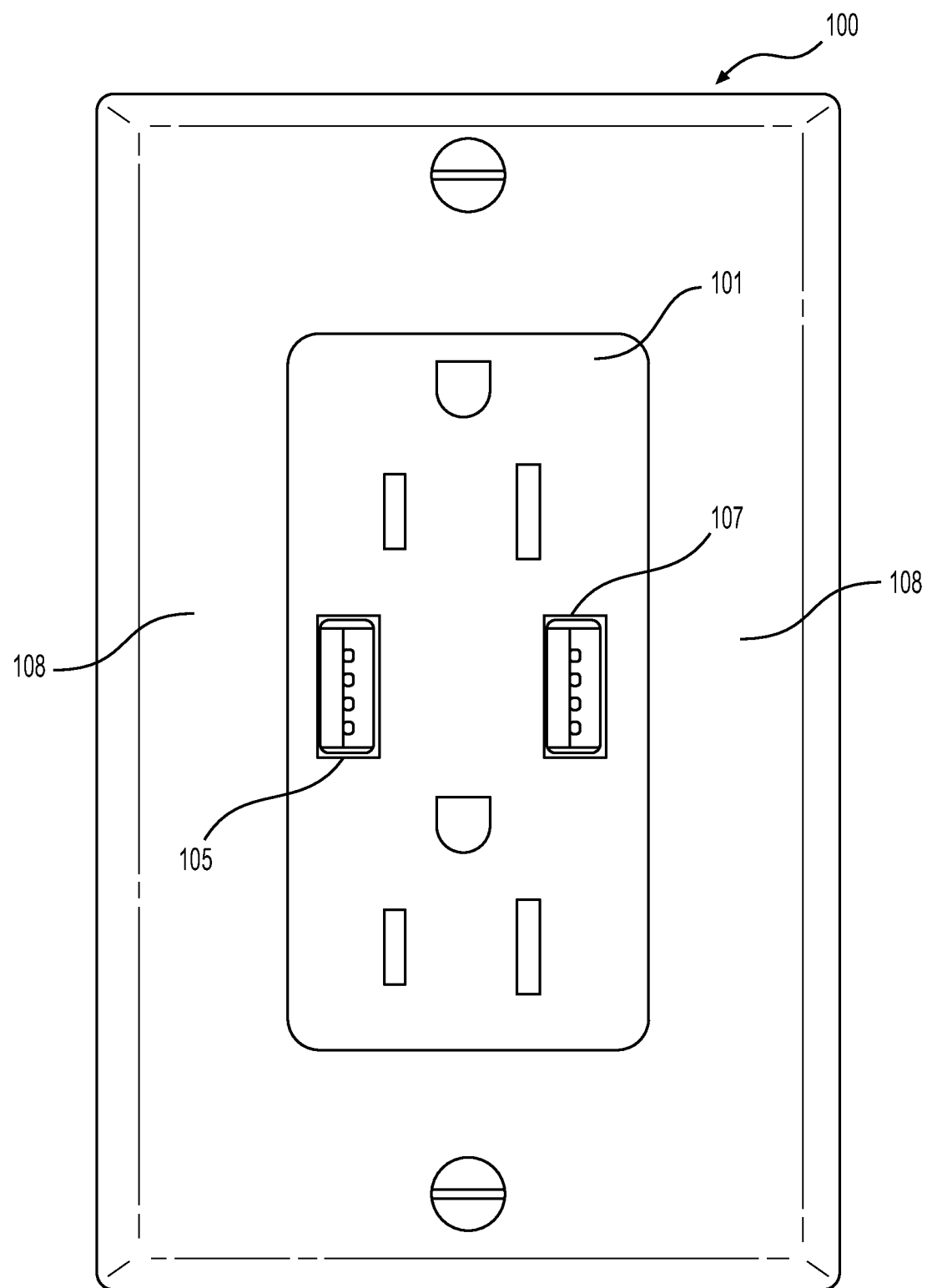
FIG. 1 is a front perspective view of a prior art combination AC and DC power outlet and standard "designer" style or rectangular opening wall plate.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. The upright position of the wall plate described herein is when attached to an outlet on a vertical wall with the outlet rotated such that one of the AC outlets of the wall outlet is above the other AC outlet. Vertical, horizontal above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above," "below," "over," and "under" mean "having an elevation or vertical height, or a spacing relative to another feature, which is greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "connector" and "plug" are used interchangeably herein to refer to conductive connectors attached to opposed ends of mobile device charging cables.

Figure 2:
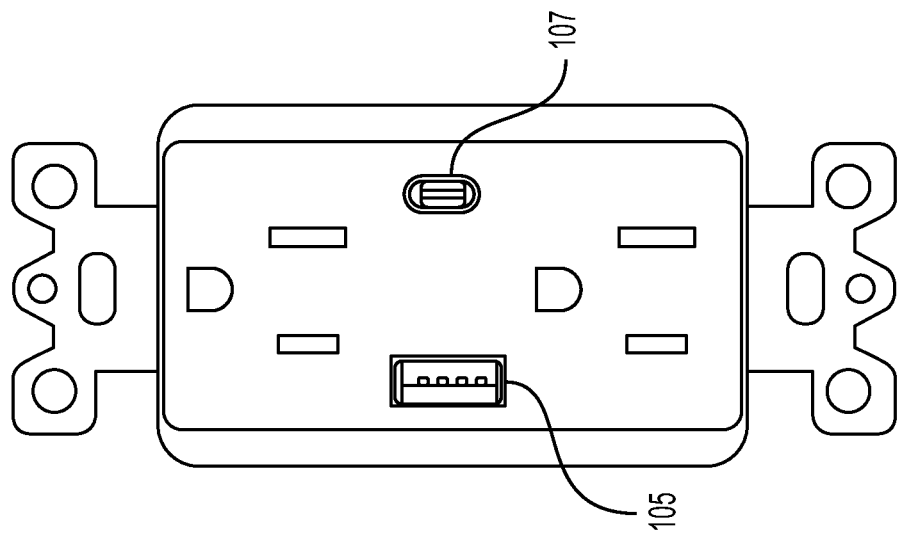
FIG. 2 is an exploded front perspective view of a prior art combination AC and DC power outlet and standard "designer" style or rectangular opening wall plate.
Figure 2:
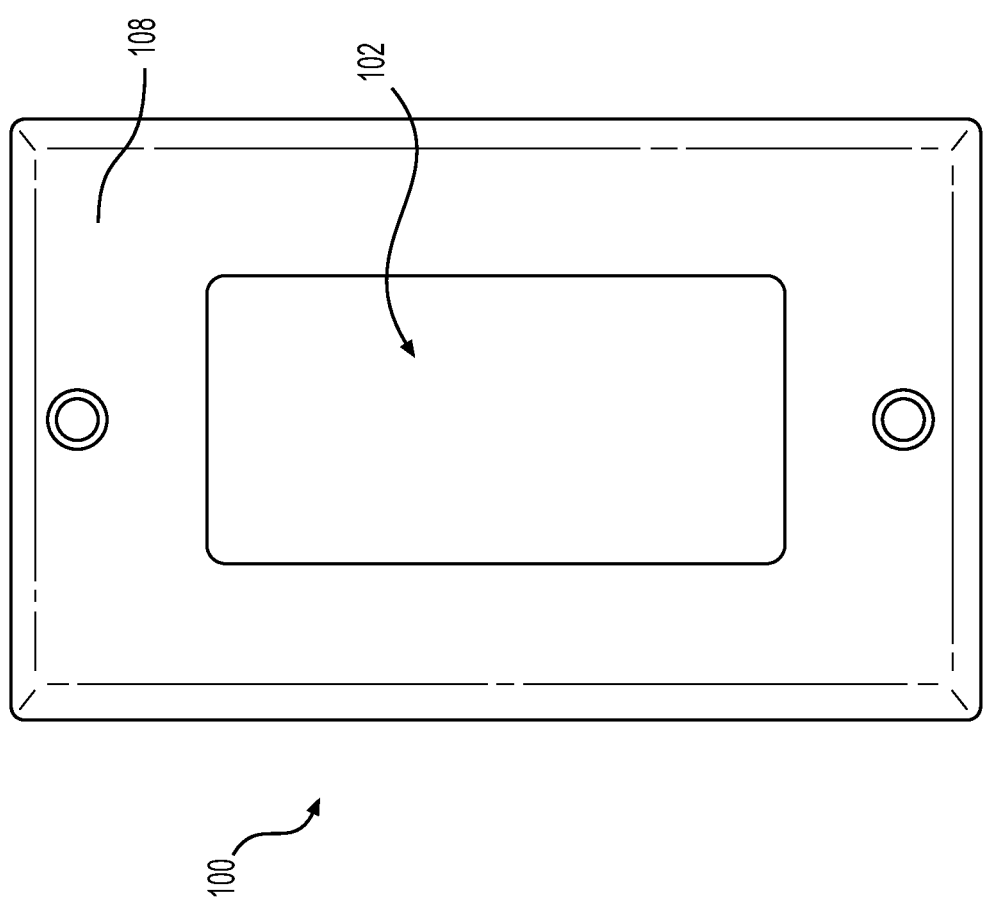
Figure 3:
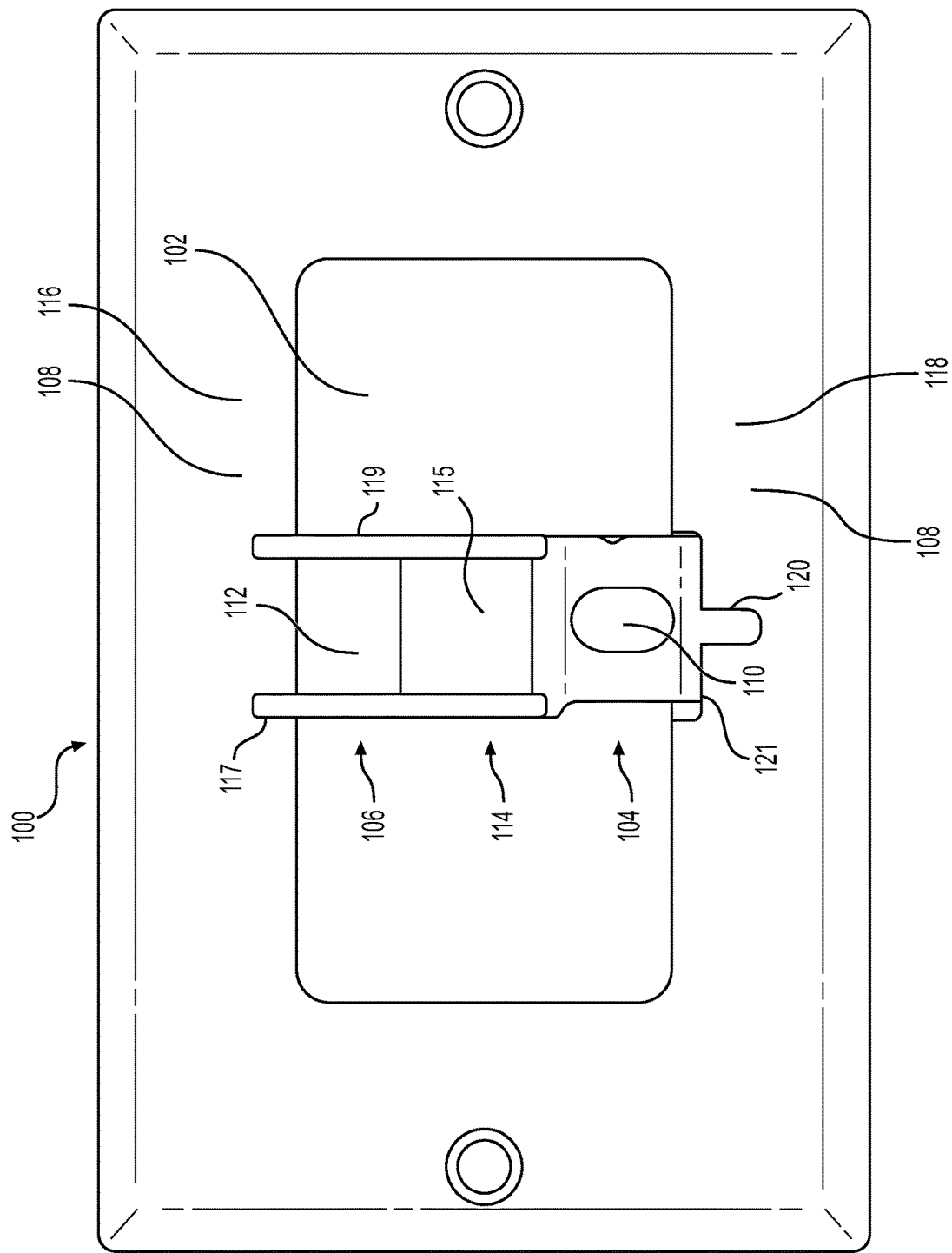
FIG. 3 is a front perspective view of a wall plate according to a first embodiment of the invention.
Figure 4:
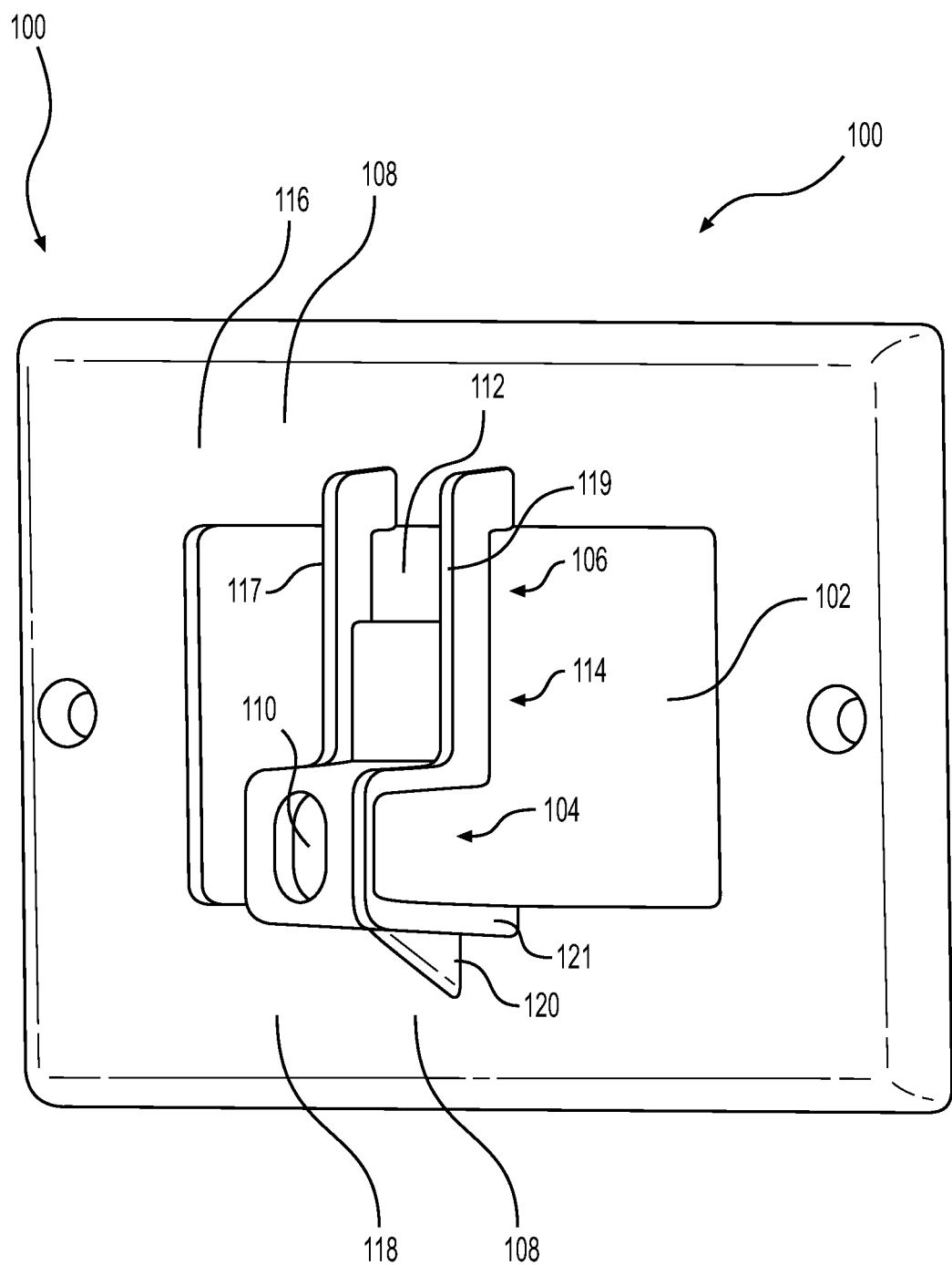
FIG. 4 is an isometric bottom view of the wall plate of FIG. 3.
Figure 5:
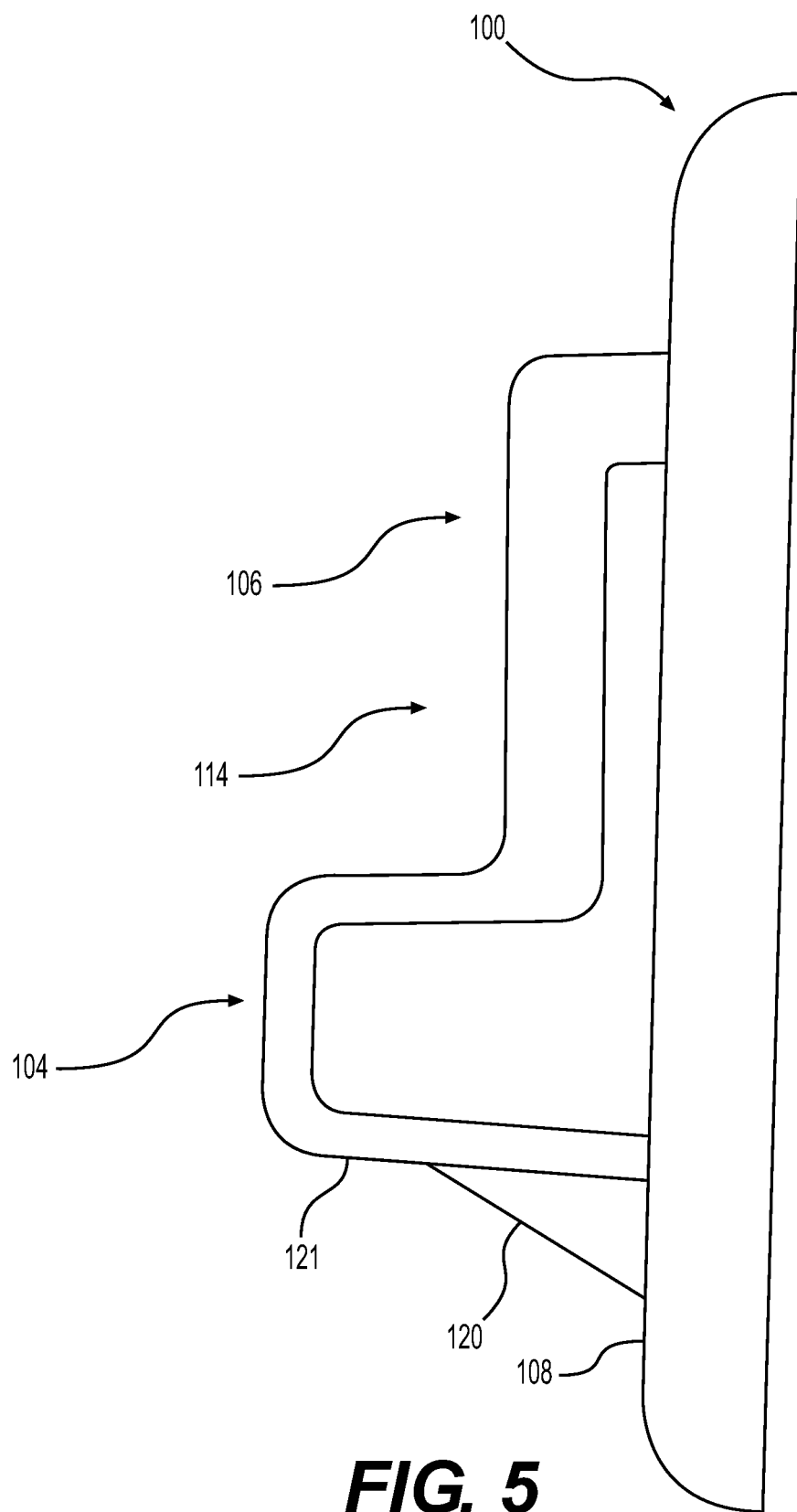
FIG. 5 is a bottom perspective view of the wall plate of FIG. 3.
Figure 6:
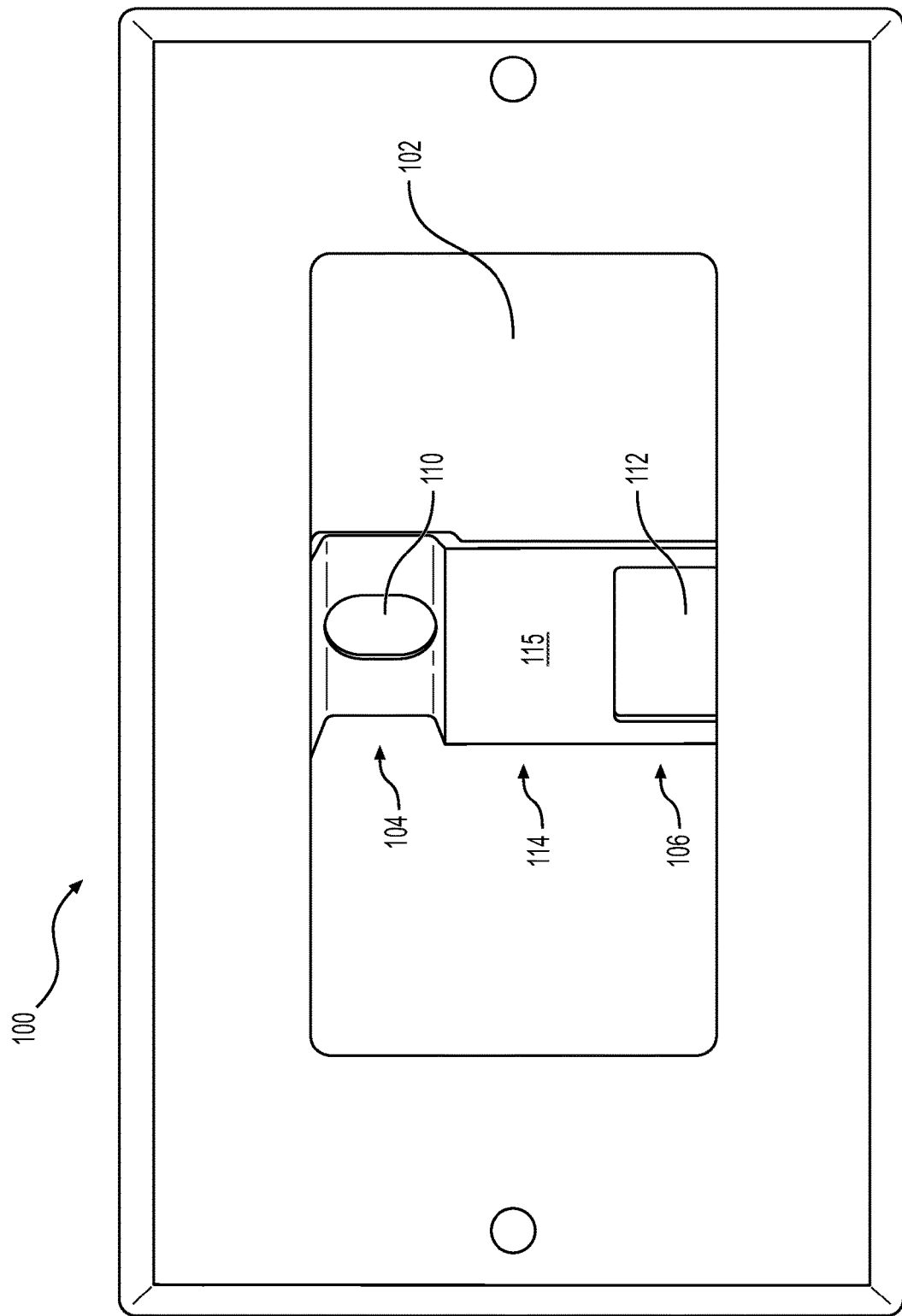
FIG. 6 is a rear perspective view of the wall plate of FIG. 3.
Figure 7:
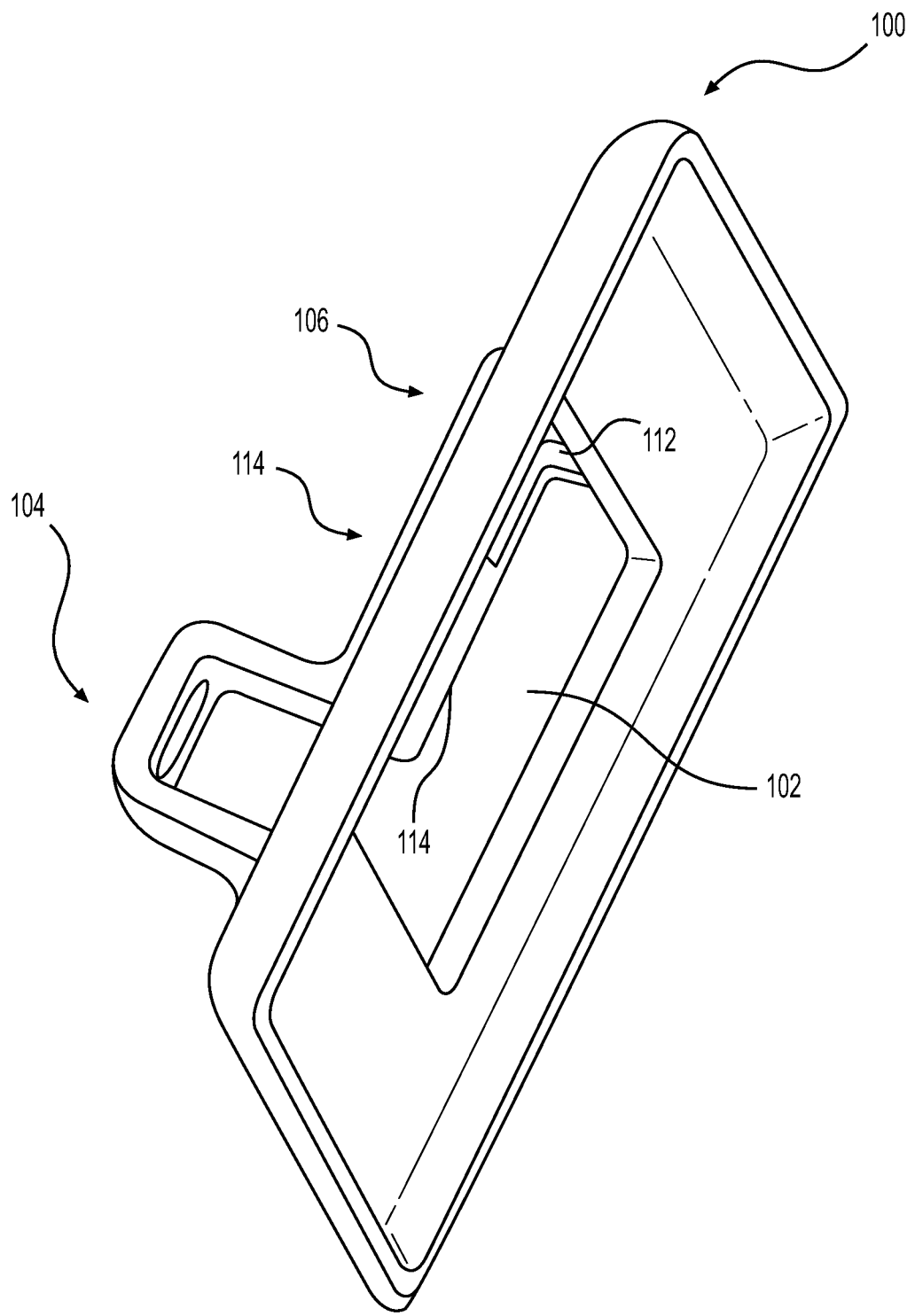
FIG. 7 is a rear bottom isometric view of the wall plate of FIG. 3.
Figure 8:
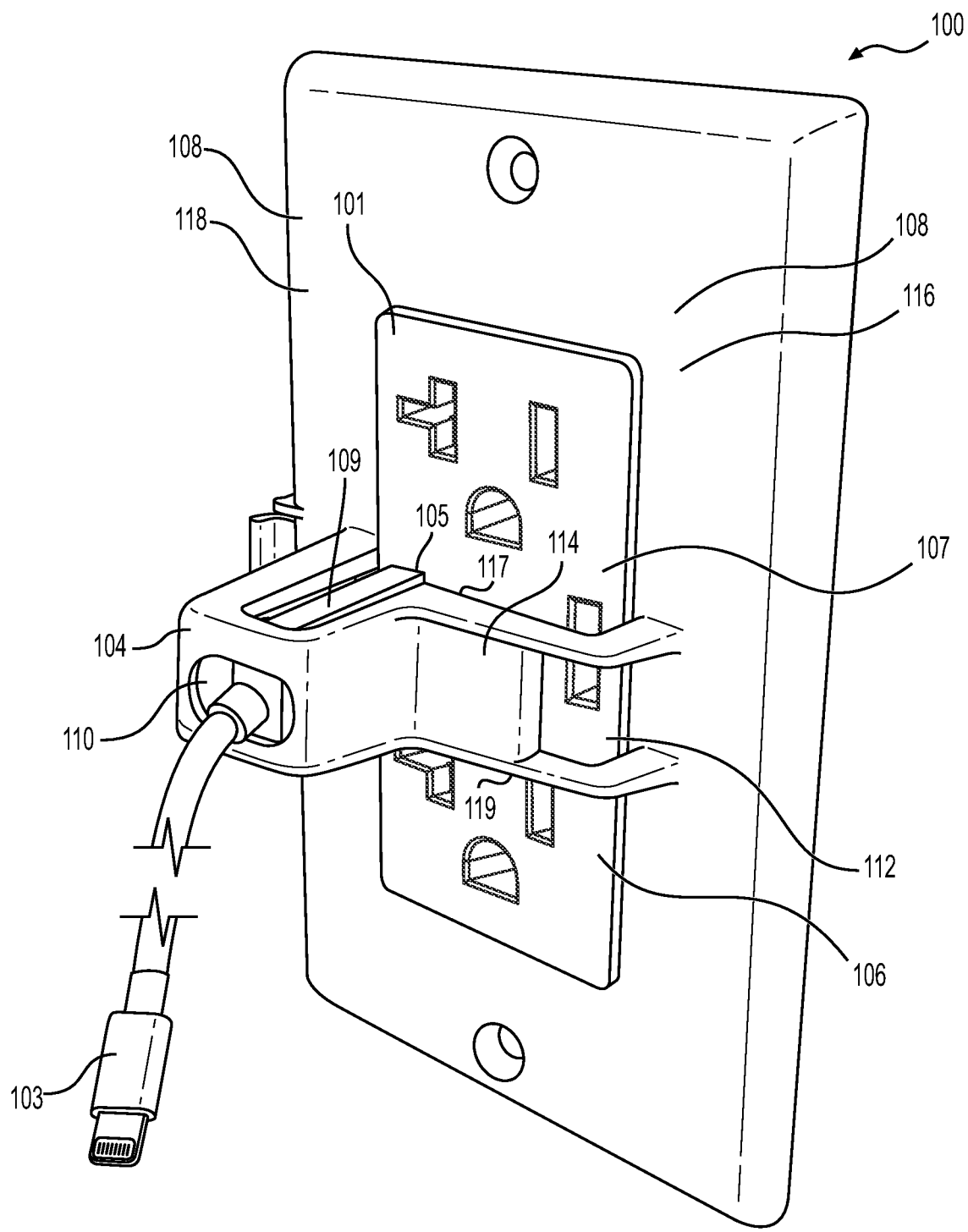
FIG. 8 is a left front perspective view of the wall plate of FIG. 1 seated on the prior art combination AC and DC power outlet with a prior art charging cable plugged into a first DC port of the outlet.

Referring to FIGS. 1-2, a typical configuration of a common wall plate 1 (i.e., a wall plate with a front face 108 that is devoid of any cable retaining features) and an AC wall outlet 101 with DC USB electrical power ports 105 and 107 are shown.

Referring now to FIGS. 3-8, in an embodiment, a cover plate 100 includes a generally rectangular or "designer" opening 102 configured to receive an AC wall mounted power receptacle 101. The cover plate 100 includes a cable connector retention member 104 and a cable pass-through section 106. The cable connector retention member 104 and the cable pass-through section 106 protrude from a front face 108 of the cover plate 100. The retention member 104 protrudes far enough from the front face 108 of the cover plate 100 to allow the cover plate 100 to seat on the receptacle 101 while a first connector 109 (e.g., a USB plug) is in a corresponding DC USB electrical power port 105 of the wall mounted power receptacle 101. The cable connector retention member 104 includes a slot 110 configured to allow a second connector 109 (e.g., a connector for connection to a mobile device to be charged) to pass-through the slot 110 in a first orientation but not a second orientation 90 degrees off from the first orientation. When the first connector 109 is in the DC USB electrical power port 105, it is in the second orientation relative to the slot 110. The pass-through section 106 includes a cable connector access opening 112 that allows the first connector 109 to be received in a second DC USB electrical power port 107 corresponding to the cable pass-through section 106 regardless of orientation of the connector 103 relative to the cable connector access opening 112 and cable pass-through section 106. The cable connector retention member 104 and cable pass-through section 106 cooperate to form a bridge member 114 between opposing sides 116 and 118 of the front face 108, the member 114 spanning the opening 102 in the cover plate 100. In one embodiment, the cable connector retention member 104 extends further from the front face 108 of the cover plate 100 than the cable pass-through section 106 of the cover plate 100 does to make it easier to access and insert/remove the first connector 109. In embodiments, the slot 110 is sized and shaped such that the device connector (e.g., Apple's Lightning® connector) has to be rotated, such as 90°, in order to be passed through the slot 110. In other embodiments, the slot 110 is sized and shaped such that the device connector can be passed therethrough in any orientation, but the USB connector cannot.

A central bridging section 115 of bridge member 114 connects cable pass-through section 106 to cable connector retention member 104.

The cable pass-through section 106 may, in embodiments, define one or more strengthening ribs 117, 119. In embodiments, ribs 117, 119 extend along bridging section 115 as well.

A strengthening web 120 may be connected between a sidewall 121 of the cable connector retention member 104 and the front face 108 of the cover plate 100.

Figure 9A:
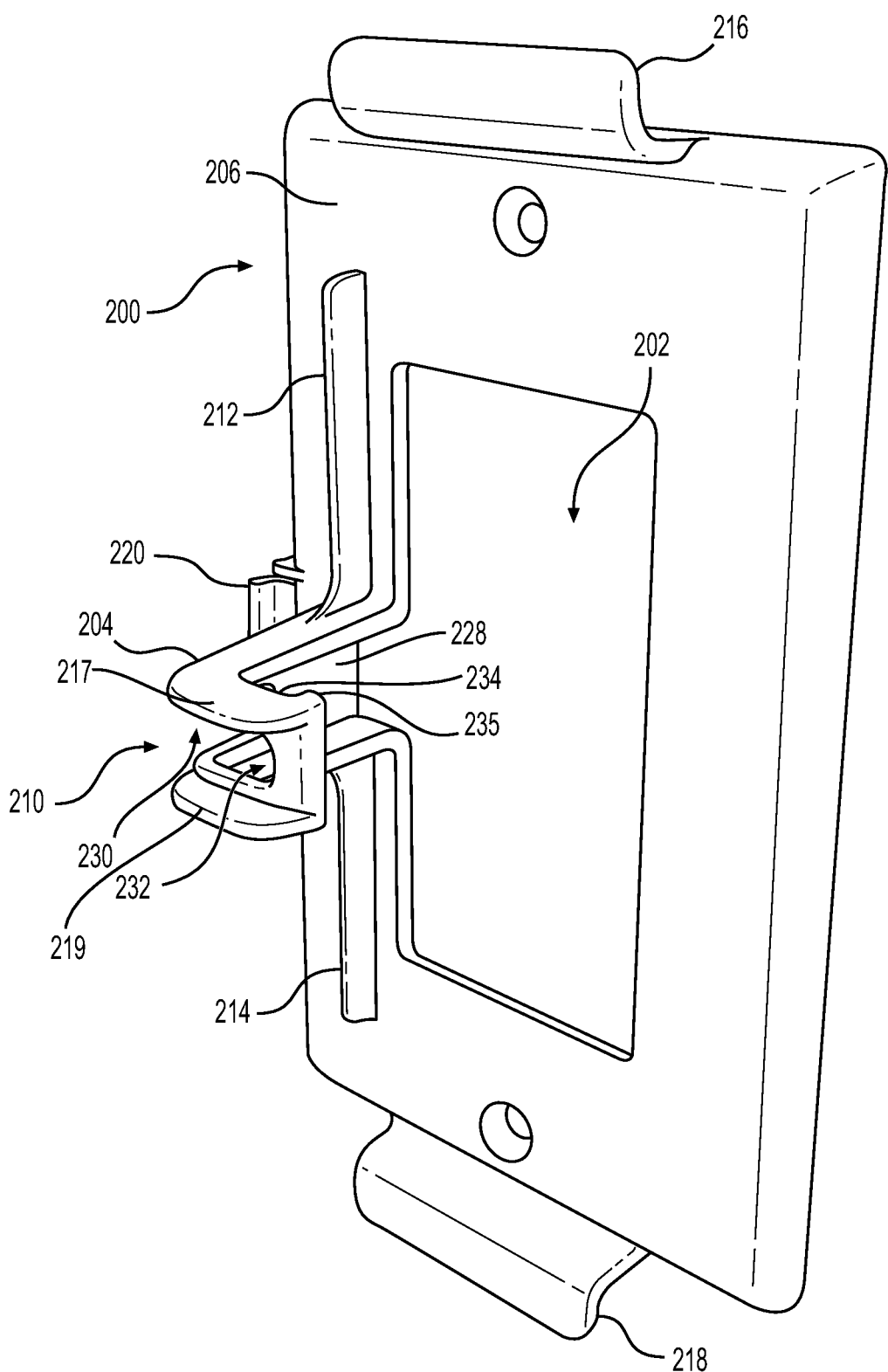
FIG. 9A is a left front perspective view of a wall plate according to a second embodiment of the invention.
Figure 9B:
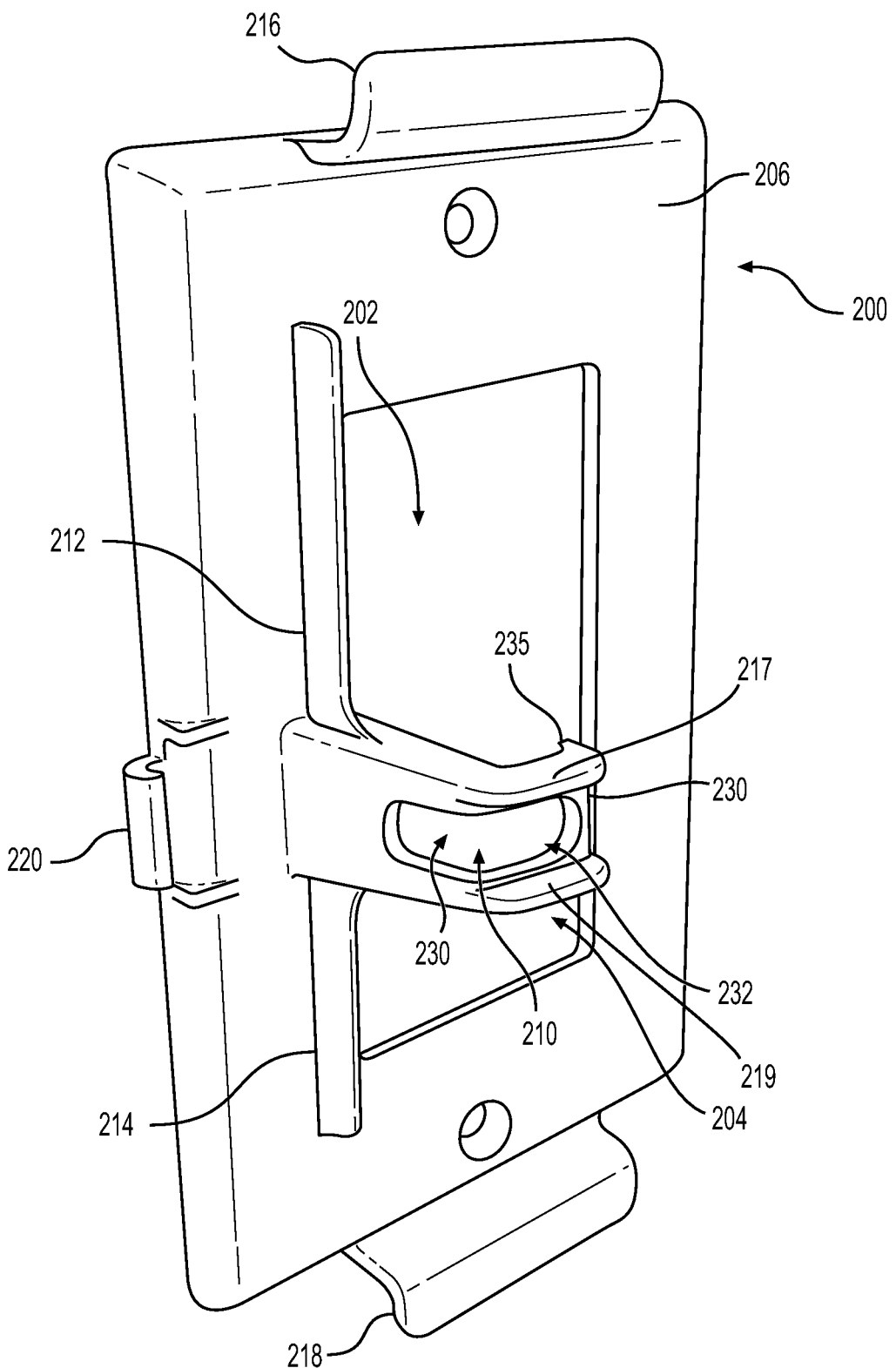
FIG. 9B is a right front perspective view of the wall plate of FIG. 9A.
Figure 10:
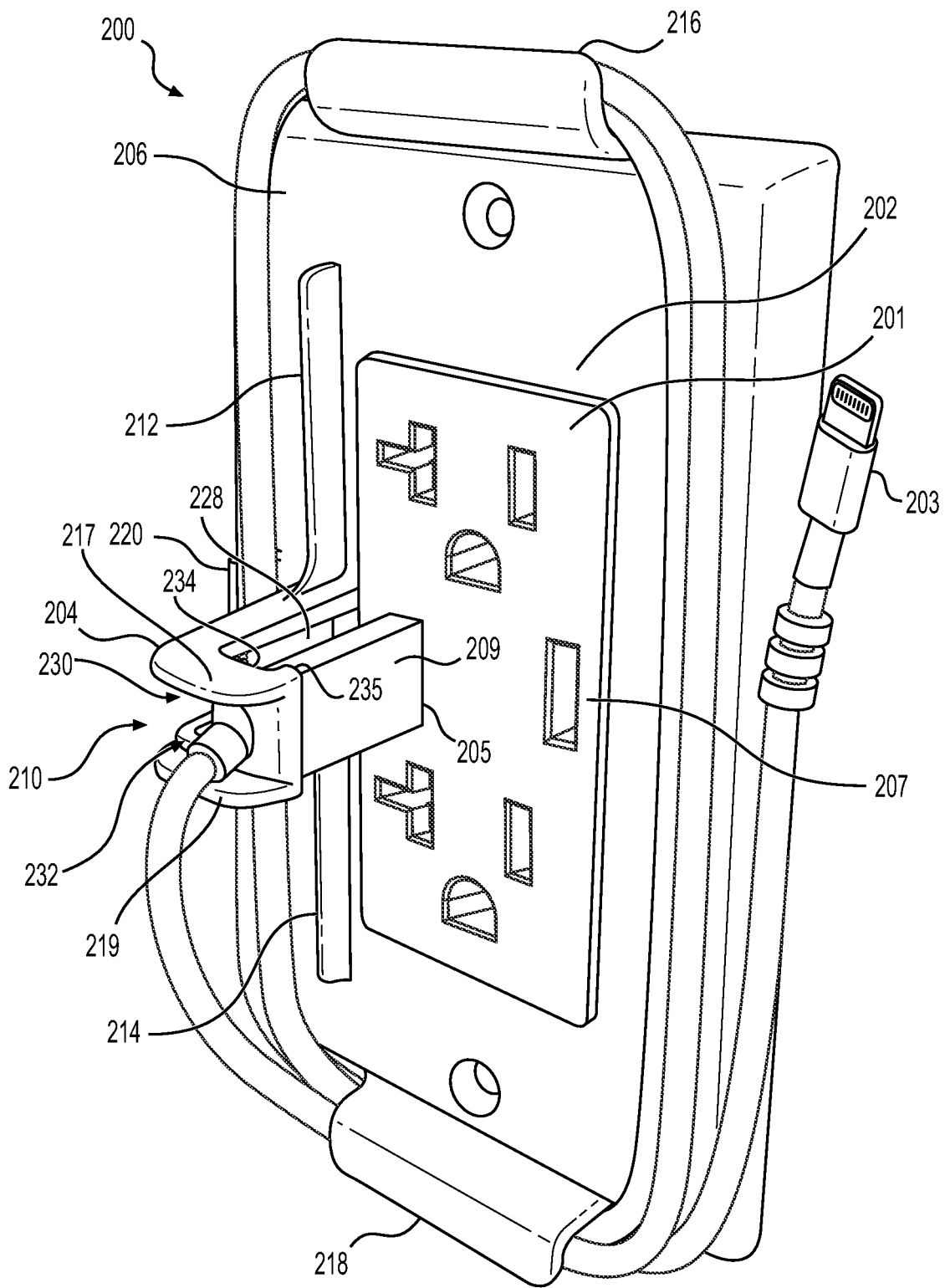
FIG. 10 is an isometric view of the wall plate of FIG. 9 seated on the prior art combination AC and DC power outlet with the prior art charging cable plugged into a first DC port of the outlet.

Referring now to FIGS. 9-10, in another embodiment, the wall plate 200 includes a generally rectangular or "designer" opening 202 configured to receive an AC wall outlet 201. The wall plate 200 includes a cord retention member 204. The retention member 204 comprises a top wall 234 spaced from the face 206 of the wall plate 200 and a sidewall 228 connecting the top wall 234 with the plate 200. The cord retention member 204 protrudes from a front face 208 of the wall plate 200. The cord retention member 204 protrudes far enough to allow the wall plate 200 to seat on the outlet 201 while a first connector 209 (e.g., a USB plug 209) is in a corresponding DC outlet 205 of the wall outlet 201.

The retention member 204 includes a slot 210 configured to allow a second connector 203 (e.g., a connector for connection to a mobile device to be charged) to pass-through the slot 210 in a first orientation but not a second orientation 90 degrees off from the first orientation. When the first connector 209 is in the DC outlet 205, it is in the second orientation relative to the slot 210. The retention member 204, and, optionally, strengthening members such as retention member stabilization webs 212 and 214, extend from the front face 206 of wall plate 200. The wall plate 200 (optionally) includes an upper cord winding hook 216, a lower cord winding hook 218 and a side cord winding hook 220.

In embodiments, the slot 210 is sized and shaped such that the device connector 203 (e.g., Apple's Lightning® connector) has to be rotated, such as 90°, in order to be passed through the slot 210. In other embodiments, the slot 210 is sized and shaped such that the device connector can be passed therethrough in any orientation, but the USB connector cannot. The proximity of the inner surface of the top wall 234 of the retention member 204 to the plug 209 ensures retention of the first plug 209 in socket 205 when the plate 200 is seated on the outlet 201 and the first cable plug 209 is plugged into the power port that is in registry with the first retention element 204.

In embodiments, top wall 234 of the retention member 204 is substantially parallel to the face 202 of the plate 200. Further in embodiments, side wall 228 of the retention member 204 is substantially perpendicular to the face 202 of the plate 200. The slot 210 defined by the retention member 204 extends from the top wall 234 of the retention member 204 around to the side wall 228 of the retention member 204, forming one continuous slot 210 that allows the cord to move within the slot, which beneficially reduces stress and wear and tear on the cord, retention member and plug. Such wear and tear can occur when the cord is pulled, yanked and/or twisted by users. In further embodiments, a return section 235 creates a hook-shaped retention member 204 protruding from the top wall 234 of the retention member 204 toward the outlet 201 to retain the connector 209 from moving laterally when connected to the USB port 205 to prevent the unwanted removal of the connector 209, preserve its connection to the USB port 205, and from otherwise being moved out of place. This makes it harder to steal the cable by removing the connector 209, and beneficially reduces stress and wear and tear on the cord, retention member and plug. Such wear and tear can occur when the cord is pulled, yanked and/or twisted by users. The top wall section 234 may, in embodiments, define one or more strengthening ribs 217, 219.

Figure 11A:
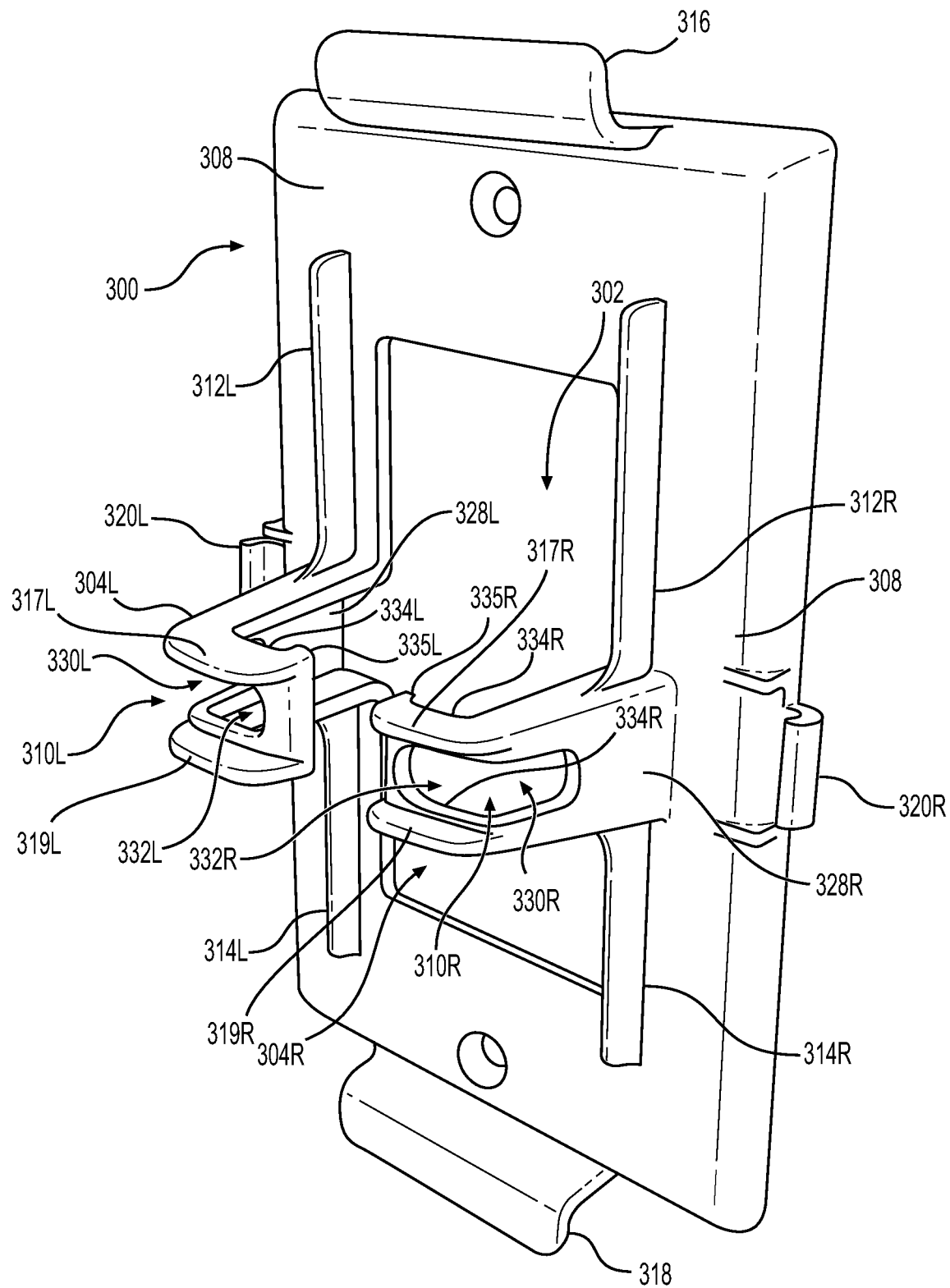
FIG. 11A is a left front perspective view of a wall plate according to a third embodiment of the invention.
Figure 11B:
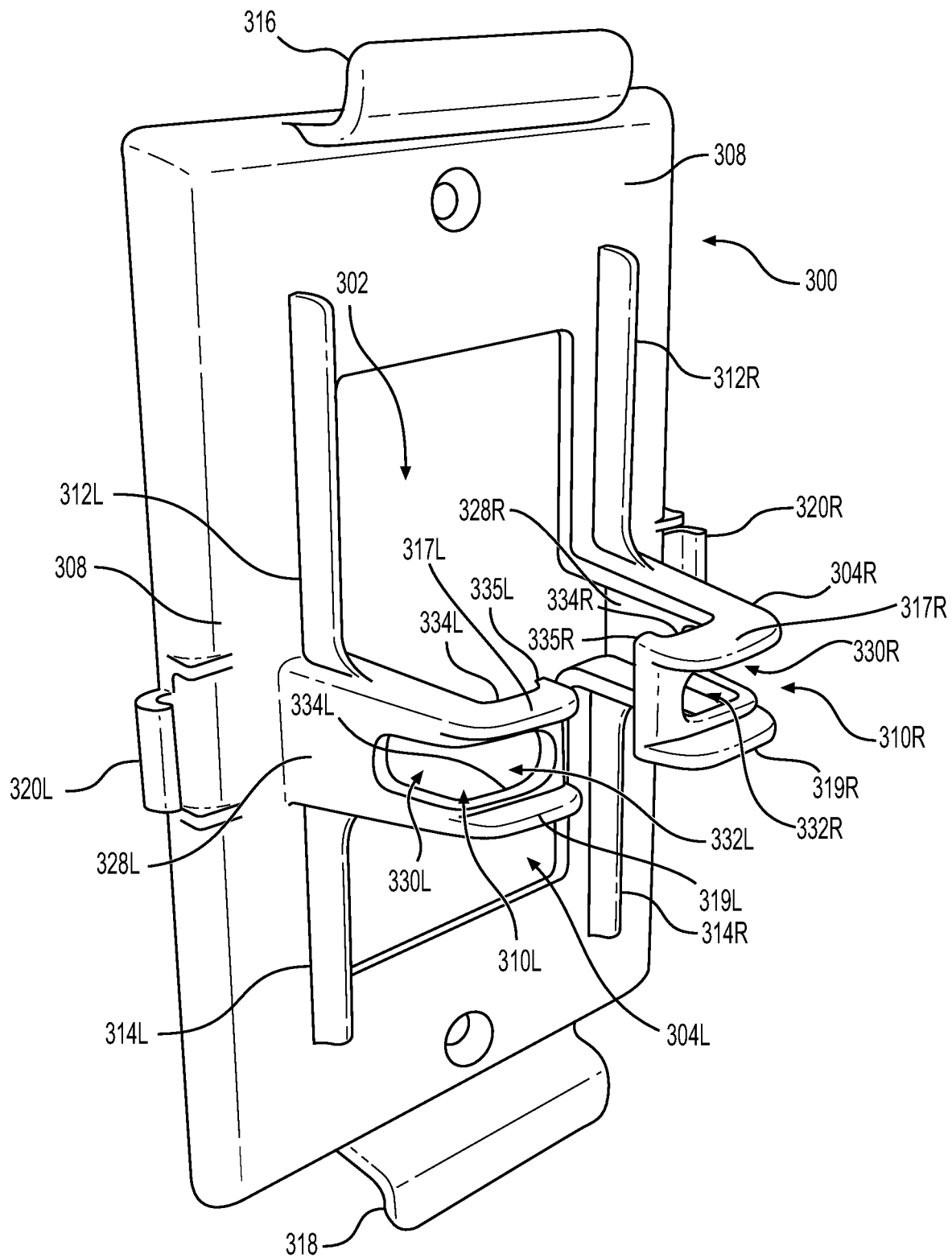
FIG. 11B is a left front perspective view of the wall plate of FIG. 11A.
Figure 12:
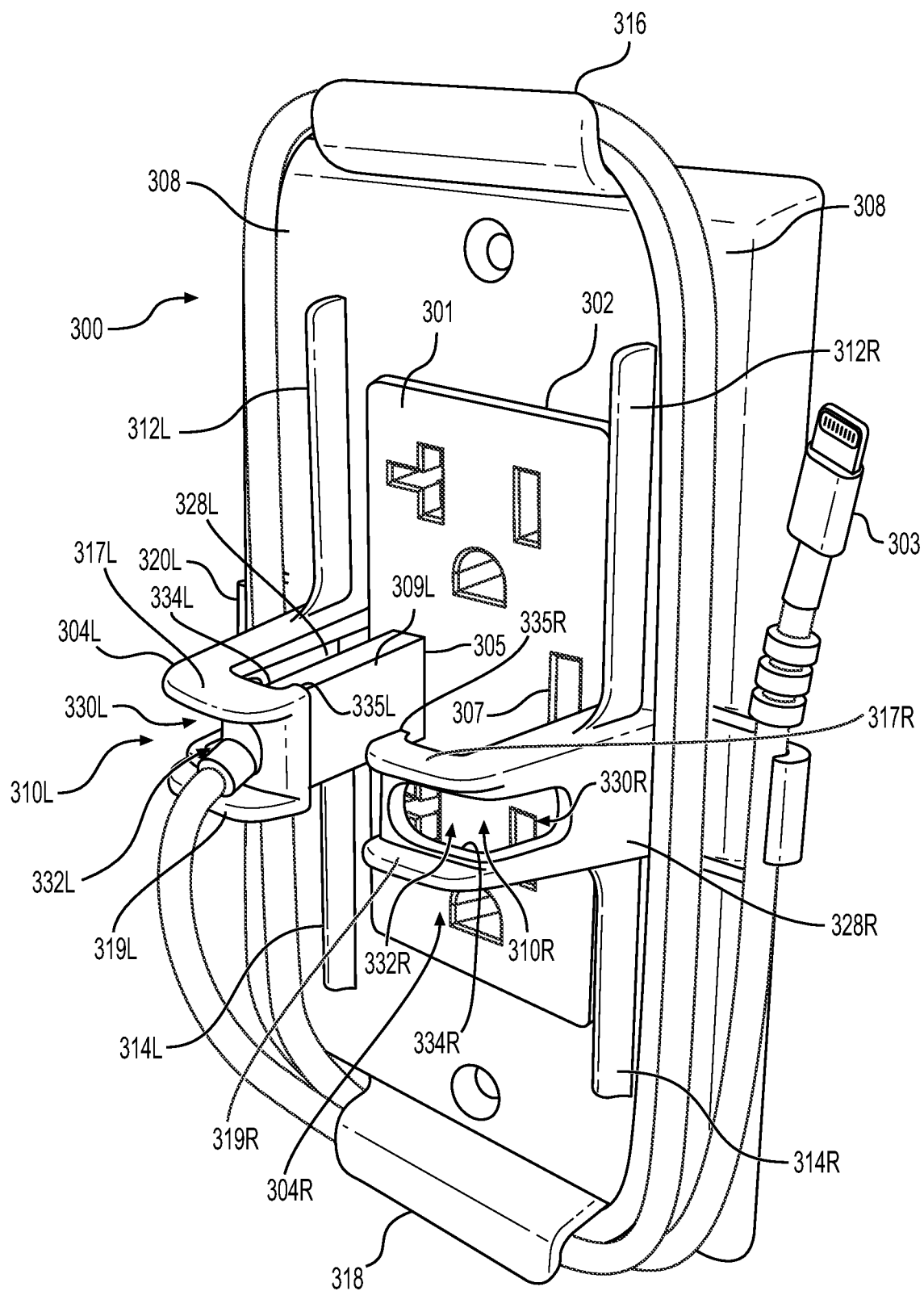
FIG. 12 is an isometric view of the wall plate of FIG. 11 seated on the prior art combination AC and DC power outlet with the prior art charging cable plugged into a first DC port of the outlet.

Referring now to FIGS. 11-12, in another embodiment, the wall plate 300 includes a generally rectangular or "designer" opening 302 configured to receive an AC wall outlet 301. The wall plate 300 includes left and right cord retention members 304L and 304R. The retention member 304L comprises a top wall 334L spaced from the face 308 of the wall plate 300 and a sidewall 328L connecting the top wall 334L with the plate 300. The retention member 304R comprises a top wall 334R spaced from the face 308 of the wall plate 300 and a sidewall 328R connecting the top wall 334R with the plate 300. The cord retention members 304L and 304R protrude from a front face 308 of the wall plate 300. The cord retention members 304L and 304R protrude far enough from the front face 308 to allow the wall plate 300 to seat on AC outlet 301 while one or more first connectors 309L and 309R (e.g., USB plugs 309L and 309R (309R not shown)) are seated in corresponding DC outlets 305 and 307 of the wall outlet 300. The retention members 304L and 304R respectively include slots 310L and 310R configured to allow the first and second connectors (e.g., connectors for connection to one or more mobile devices to be charged) to pass-through the slots 310L and 310R in a first orientation but not a second orientation 90 degrees off from the first orientation. When the first and second connectors are in DC outlets 305 and 307, they are in the second orientation relative to the slot 310L and 310R. The cord retention members 304L and 304R and cord retainer stabilization webs 312L, 314R, 322L and 324R extend from the front face 308 of wall plate 300. The wall plate 300 (optionally) includes an upper cord winding hook 316, a lower cord winding hook 318 and side cord winding hooks 320L and 320R. In embodiments, the slots 310L and 310R are sized and shaped such that the device connector (e.g., Apple's Lightning® connector) has to be rotated, such as 90°, in order to be passed through the slots 310L and 310R. In other embodiments, the slots 310L and 310R are sized and shaped such that the device connector can be passed therethrough in any orientation, but the USB connector cannot. The proximity of the inner surface of the top wall 334R of the retention member 304R to the plug 309R ensures retention of the first plug 309R in socket 307 when the plate 300 is seated on the outlet 301 and the first cable plug 309R is plugged into the power port that is in registry with the first retention element 304R. Top wall 334R of the retention member 304R is substantially parallel to the face 308 of the plate 300. Side wall 328R of the retention member 304R is substantially perpendicular to the face 308 of the plate 300. The shape of the slot 310R defined by the retainer element 304R extends from the top wall 334R of the retention member 304R around to the side wall 328R of the retention member 304R, forming one continuous slot 310R that allows the cord to move within the slot 310R, which beneficially reduces stress and wear and tear on the cord, retention member and plug. Such wear and tear can occur when the cord is pulled, yanked and/or twisted by users. Similarly, the proximity of the inner surface of the top wall 334L of the retention member 304L to the plug 309L ensures retention of the first plug 309L in socket 305 when the plate 300 is seated on the outlet 301 and the first cable plug 309L is plugged into the power port that is in registry with the first retention element 304L. Top wall 334L of the retention member 304L is substantially parallel to the face 308 of the plate 300. Side wall 328L of the retention member 304L is substantially perpendicular to the face 308 of the plate 300. The shape of the slot 310L defined by the retainer element 304L extends from the top wall 334L of the retention member 304L around to the side wall 328L of the retention member 304L, forming one continuous slot 310L that allows the cord to move within the slot 310L, which beneficially reduces stress and wear and tear on the cord, retention member and plug. Such wear and tear can occur when the cord is pulled, yanked and/or twisted by users. The top wall section 334L may, in embodiments, define one or more strengthening ribs 317L, 319L. The top wall section 334R may, in embodiments, define one or more strengthening ribs 317R, 319R.

In further embodiments, return sections 335L and 335R create hook-shaped retention members 304L and 304R protruding from top walls 234L and 334R of the retention members 304L and 304R toward the outlet 301 to retain the connector 309 from moving laterally when connected to the USB port 305 or 307 to prevent the unwanted removal of the connector 309, preserve its connection to the USB port 305 or 307, and from otherwise being moved out of place.

Figure 13A:
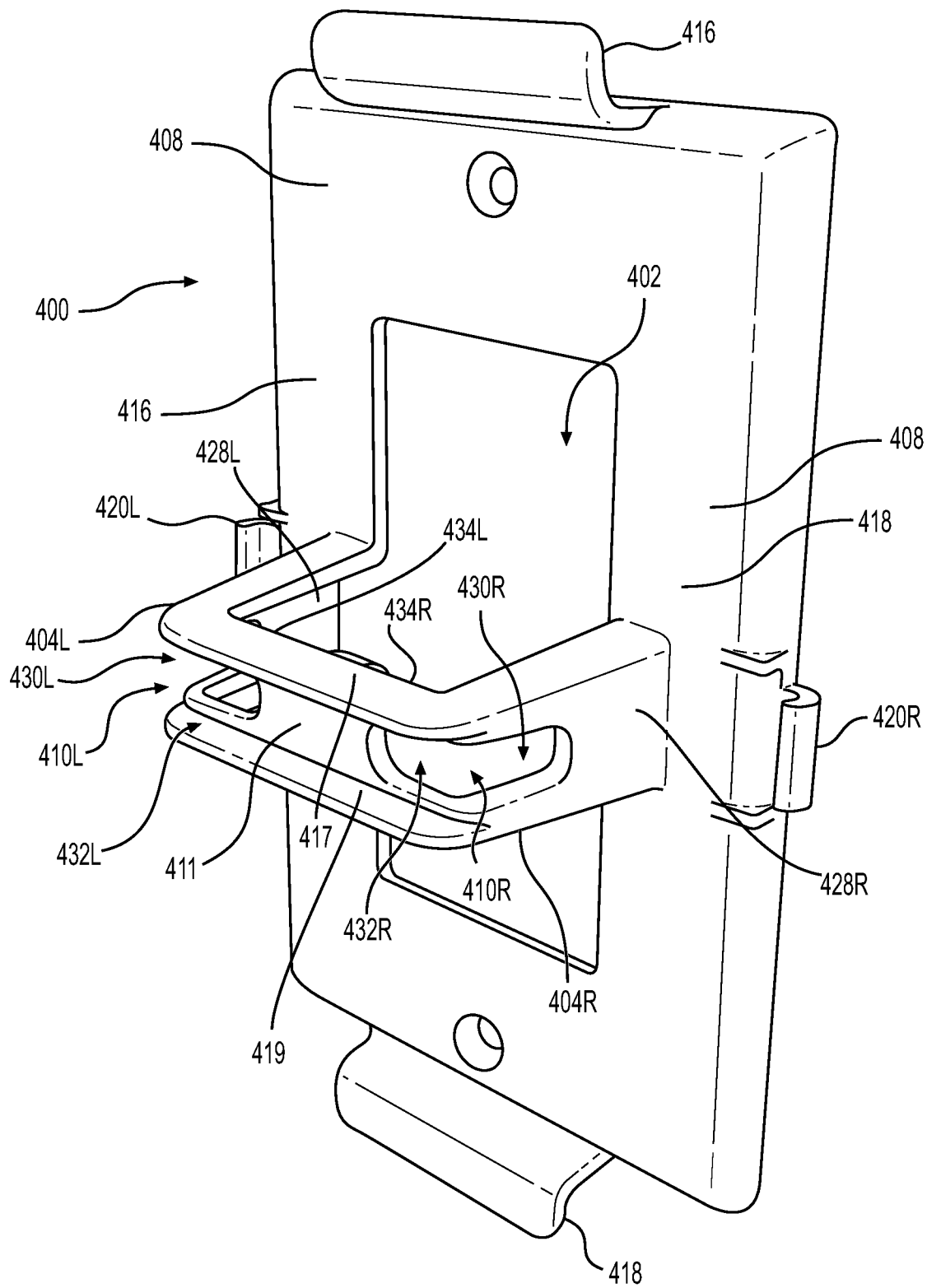
FIG. 13A is a left front perspective view of a wall plate according to a fourth embodiment of the invention.
Figure 13B:
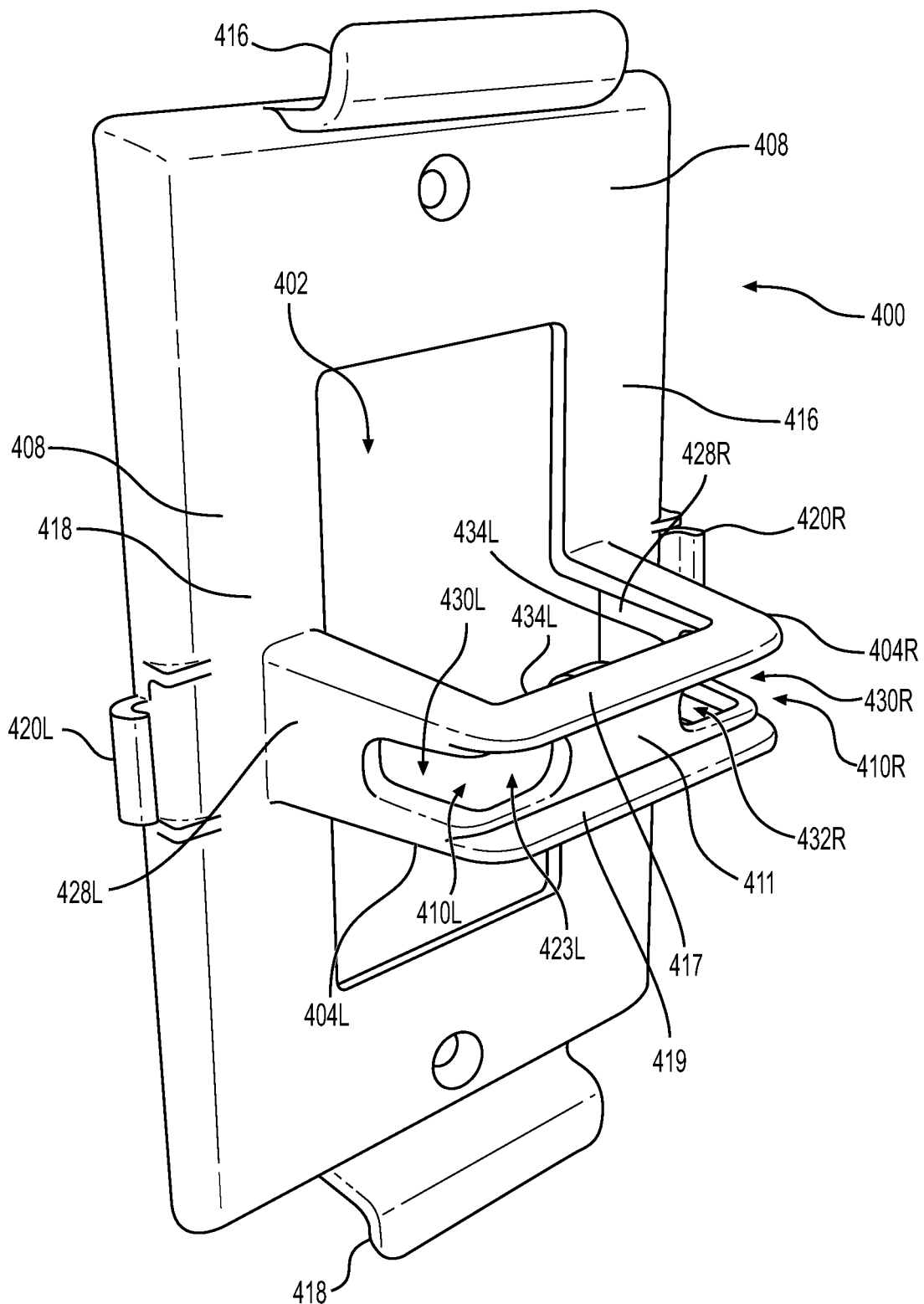
FIG. 13B is a left front perspective view of the wall plate of FIG. 13A.
Figure 14:
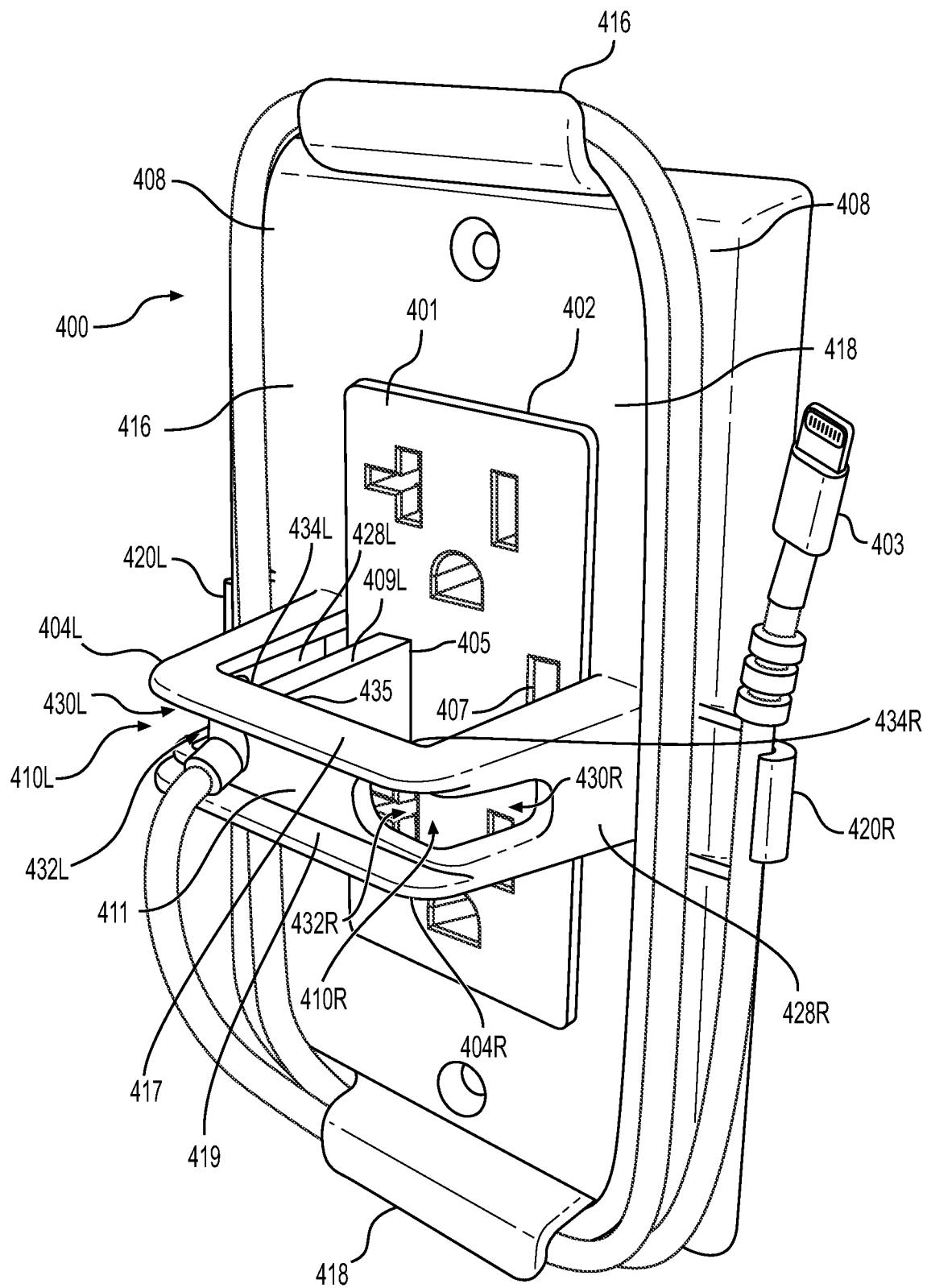
FIG. 14 is an isometric view of the wall plate of FIG. 13 seated on the prior art combination AC and DC power outlet with the prior art charging cable plugged into a first DC port of the outlet.

Referring now to FIGS. 13-14, in another embodiment, the wall plate 400 includes a generally rectangular or "designer" opening 402 configured to receive an AC wall outlet 401. The wall plate 400 includes left and right plug retention members 404L and 404R. The retention member 404L comprises a top wall 434L spaced from the face 408 of the wall plate 400 and a sidewall 428L connecting the top wall 434L with the plate 400. The retention member 404R comprises a top wall 434R spaced from the face 408 of the wall plate 400 and a sidewall 428R connecting the top wall 434R with the plate 400. The cord retention members 404L and 404R protrude from a front face 408 of the wall plate 400. The cord retention members 404L and 404R protrude far enough from the front face 408 to allow the wall plate 400 to seat on AC outlet 401 while one or more first connectors 409L and 409R (e.g., when a USB plug 409L and 409R (309R not shown)) are seated in corresponding DC outlets 405 and 407 of the wall outlet 400. The retention members 404L and 404R respectively include slots 410L and 410R configured to allow the one or more second connector(s) (e.g., a connector(s) for connection to one or more mobile device(s) to be charged) to pass-through the slots 410L and 410R in a first orientation but not a second orientation 90 degrees off from the first orientation. When the one or more first connector(s) is in DC outlet 405 and 407, it is in the second orientation relative to the slot 410L and 410R. The cord retention members 404L and 404R extend from the front face 408 of wall plate 400. The retention members 404L and 404R cooperate to form a bridge 414 between opposing sides 416 and 418 of the front face 408, the bridge 414 spanning the opening 402 in the wall plate 400. The wall plate 400 (optionally) includes an upper cord winding hook 416, a lower cord winding hook 418 and side cord winding hooks 420L and 420R. In embodiments, the slots 410L and 410R are sized and shaped such that the device connector (e.g., Apple's Lightning® connector) has to be rotated, such as 90°, in order to be passed through the slots 410L and 410R. In other embodiments, the slots 410L and 410R are sized and shaped such that the device connector can be passed therethrough in any orientation, but the USB connector cannot. The proximity of the inner surface of the top wall 434R of the retention member 404R to the plug 409R ensures retention of the first plug 409R in socket 407 when the plate 400 is seated on the outlet 401 and the first cable plug 409R is plugged into the power port that is in registry with the first retention element 404R. Top wall 434R of the retention member 404R is substantially parallel to the face 408 of the plate 400. Side wall 428R of the retention member 404R is substantially perpendicular to the face 408 of the plate 400. The shape of the slot 410R defined by the retainer element 404R extends from the top wall 434R of the retention member 404R around to the side wall 428R of the retention member 404R, forming one continuous slot 410R that allows the cord to move within the slot 410R, which beneficially reduces stress and wear and tear on the cord, retention member and plug. Such wear and tear can occur when the cord is pulled, yanked and/or twisted by users. Similarly, the proximity of the inner surface of the top wall 434L of the retention member 404L to the plug 409L ensures retention of the first plug 409L in socket 405 when the plate 400 is seated on the outlet 401 and the first cable plug 409L is plugged into the power port that is in registry with the first retention element 404L. Top wall 434L of the retention member 404L is substantially parallel to the face 408 of the plate 400. Side wall 428L of the retention member 404L is substantially perpendicular to the face 408 of the plate 400. The shape of the slot 410L defined by the retainer element 404L extends from the top wall 434L of the retention member 404L around to the side wall 428L of the retention member 404L, forming one continuous slot 410L that allows the cord to move within the slot 410L, which beneficially reduces stress and wear and tear on the cord, retention member and plug. Such wear and tear can occur when the cord is pulled, yanked and/or twisted by users. Further stability for the retention members 410L and 410R is achieved by the inclusion of bridge section 411 which connects the retention members 410L and 410R to strengthen the retention members and enhance the security of the apparatus. The top wall sections 434L and 434R may, in embodiments, define one or more strengthening ribs 417, 419. In embodiments, ribs 417, 419 extend along bridging section 411 as well.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful CABLE RETAINING WALL PLATE FOR COMBINATION AC AND DC POWER OUTLETS, it is not intended that such references be construed as limitations upon the scope of this invention except as set forth in the following claims.

I claim:

1. A cover plate for a wall mounted power receptacle, the cover plate having a front face and defining a generally rectangular opening adapted to surround the power receptacle, the receptacle having one or more electrical power ports for supplying power through one or more electrical device charging cables, each charging cable having a first connector adapted to be plugged into one of the power ports and a cord, the cover plate comprising:
    a bridge member comprised of a first, cable connector, retention, member, a second, cable pass-through, section defining a cable connector access opening, and a third, bridging, section connecting the retention member to the cable pass-through section, the cable connector retention member protruding far enough from the front face of the plate to allow the plate to seat on the outlet while the first connector is plugged into the power port under the retention member;
    wherein the cable pass-through section and the bridging section are spaced from the face of the plate by a smaller distance than a space between the cable connector retention member and the face of the plate so as to prevent a cable connector from being lockingly retained by the cable pass-through section or the bridging section.

2. The cover plate of claim 1, wherein the cable connector retention member defines a slot configured to allow a second connector attached to the cable to pass-through the slot in a first orientation but not a second orientation 90 degrees off from the first orientation.

3. The cover plate of claim 1, wherein the cable pass-through opening is sized and shaped to permit a user to grasp a second connector attached to the cable that is plugged into one of the electrical power ports in registry with the cord pass-through opening.

4. The cover plate of claim 1, wherein the cable pass-through section defines one or more strengthening ribs.

5. The cover plate of claim 4, wherein the bridging section defines one or more strengthening ribs.

6. The cover plate of claim 1, further comprising a strengthening web connected between a sidewall of the cable connector retention member and the face of the plate.

7. A cover plate for a wall mounted power receptacle, the cover plate having a front face and defining a generally rectangular opening adapted to surround the power receptacle, the receptacle having one or more USB electrical power ports for supplying power through one or more electrical device charging cables, each charging cable having a first connector adapted to be plugged into one of the power ports and a cable, the wall plate comprising:
    a cable connector retention member protruding far enough from the front face of the plate to allow the plate to seat on the outlet while the first connector is plugged into the power port in registry with the retention member;

a cord pass-through section defining a cable connector access opening; and a bridging section connecting the cable retention member to the cord pass-through section, the cable connector retention member protruding far enough from the front face of the plate to allow the plate to seat on the outlet while the first connector is plugged into the power port under the retention member;

wherein the cable pass-through section and the bridging section are spaced from the face of the plate by a smaller distance than a space between the cable connector retention member and the face of the plate so as to prevent a cable connector from being lockingly retained by the cable pass-through section or the bridging section.

8. The cover plate of claim 7, wherein the cable connector retention member defines a slot configured to allow a second connector attached to the cable to pass-through the slot in a first orientation but not a second orientation 90 degrees off from the first orientation.

9. The cover plate of claim 7, wherein the cable pass-through opening is sized and shaped to permit a user to grasp a second connector attached to the cable that is plugged into one of the electrical power ports in registry with the cord pass-through opening.

10. The cover plate of claim 7, wherein the cable pass-through section defines one or more strengthening ribs.

11. The cover plate of claim 10, wherein the bridging section defines one or more strengthening ribs.

12. The cover plate of claim 7, further comprising a strengthening web connected between a sidewall of the cable connector retention member and the face of the plate.

* * * * *